United States Patent
Nakagawa et al.

(10) Patent No.: US 9,340,692 B2
(45) Date of Patent: May 17, 2016

(54) INK, INKJET RECORDING METHOD, AND RECORDED MATTER

(71) Applicants: Tomohiro Nakagawa, Kanagawa (JP); Naohiro Toda, Kanagawa (JP); Hidefumi Nagashima, Kanagawa (JP); Juichi Furukawa, Kanagawa (JP); Hikaru Kobayashi, Kanagawa (JP)

(72) Inventors: Tomohiro Nakagawa, Kanagawa (JP); Naohiro Toda, Kanagawa (JP); Hidefumi Nagashima, Kanagawa (JP); Juichi Furukawa, Kanagawa (JP); Hikaru Kobayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 11 days.

(21) Appl. No.: 14/643,639

(22) Filed: Mar. 10, 2015

(65) Prior Publication Data

US 2015/0259553 A1    Sep. 17, 2015

(30) Foreign Application Priority Data

Mar. 13, 2014   (JP) ................................ 2014-050063

(51) Int. Cl.

| | |
|---|---|
| *G01D 11/00* | (2006.01) |
| *C09D 11/36* | (2014.01) |
| *C09D 11/102* | (2014.01) |
| *C09D 11/40* | (2014.01) |
| *C09D 11/10* | (2014.01) |
| *C09D 11/30* | (2014.01) |

(52) U.S. Cl.
CPC ............... *C09D 11/36* (2013.01); *C09D 11/10* (2013.01); *C09D 11/102* (2013.01); *C09D 11/30* (2013.01); *C09D 11/40* (2013.01)

(58) Field of Classification Search
CPC ............................... C09D 11/36; C09D 11/40
See application file for complete search history.

(56) References Cited

U.S. PATENT DOCUMENTS

| | | |
|---|---|---|
| 2005/0036021 A1 | 2/2005 | Ito et al. |
| 2010/0041816 A1 | 2/2010 | Ikoshi et al. |
| 2010/0225697 A1* | 9/2010 | Furukawa .................... 347/17 |
| 2011/0318551 A1 | 12/2011 | Nakagawa |
| 2012/0306977 A1* | 12/2012 | Komatsu ............. C09D 11/106 347/100 |
| 2014/0069295 A1* | 3/2014 | Fujii et al. ................... 106/31.78 |
| 2014/0192112 A1 | 7/2014 | Nagashima et al. |
| 2014/0267520 A1 | 9/2014 | Toda et al. |
| 2014/0377516 A1 | 12/2014 | Toda et al. |
| 2015/0050467 A1 | 2/2015 | Nakagawa et al. |

FOREIGN PATENT DOCUMENTS

| | | |
|---|---|---|
| CN | 101942243 | 1/2011 |
| CN | 103224737 | 7/2013 |
| EP | 1493784 A1 | 1/2005 |
| JP | 2004115635 | 4/2004 |
| JP | 2005-220352 | 8/2005 |
| JP | 2007161983 | 6/2007 |
| JP | 2008-266598 | 11/2008 |
| JP | 2009-144174 | 7/2009 |
| JP | 2011-057991 | 3/2011 |
| JP | 2011-094082 | 5/2011 |
| JP | 2011144271 | 7/2011 |
| JP | 2012092224 | 5/2012 |
| JP | 2013-112801 | 6/2013 |
| JP | 2013-204025 | 10/2013 |
| WO | WO2004/029164 A1 | 4/2004 |
| WO | WO2014/119769 A1 | 8/2014 |

OTHER PUBLICATIONS

U.S. Appl. No. 14/320,859, filed Jul. 1, 2014.
U.S. Appl. No. 14/482,134, filed Sep. 10, 2014.
U.S. Appl. No. 14/472,458, filed Aug. 29, 2014.
U.S. Appl. No. 14/505,576, filed Oct. 3, 2014.
U.S. Appl. No. 14/541,396, filed Nov. 14, 2014.
Jun. 22, 2015 European search report in corresponding European Patent Application No. 15158868.

* cited by examiner

Primary Examiner — Geoffrey Mruk
(74) Attorney, Agent, or Firm — Cooper & Dunham LLP (57) ABSTRACT

An ink contains water, a hydrosoluble organic solvent, a colorant, a resin A; and a resin B, wherein the content of the resin B is from 0.5% by weight to less than 10% by weight to the content of the resin A and the resin B has a minimum film-forming temperature at least 30° C. lower than that of the resin A.

9 Claims, 2 Drawing Sheets

INK, INKJET RECORDING METHOD, AND RECORDED MATTER

CROSS-REFERENCE TO RELATED APPLICATIONS

This patent application is based on and claims priority pursuant to 35 U.S.C. §119(a) to Japanese Patent Application No. 2014-050063, filed on Mar. 13, 2014, in the Japan Patent Office, the entire disclosure of which is hereby incorporated by reference herein.

BACKGROUND

1. Technical Field

The present invention relates to an ink and an inkjet recording method and recorded matter using the ink.

2. Background Art

In recent years, inkjet technologies have been appealing in business field of for example, display, posters, and signboards in addition to home use.

As recording media, non-porous recording media such as plastic film have been used and inks have been developed for such media.

For example, as such ink, solvent-based inkjet ink using an organic solvent as a vehicle or ultraviolet-curable inkjet ink using a polymerizable monomer as its main component have been widely used.

In addition, aqueous inks for inkjet recording have been developed which causes little burden on environment due to solvent evaporation and can be directly printed on a non-porous substrate.

Inks in which two kinds of resins are added can be also applied to various recording media.

SUMMARY

The present invention provides an improved ink containing water, a hydrosoluble organic solvent, a colorant, a resin A, and a resin B, wherein the content of the resin B is from 0.5% by weight to less than 10% by weight to the content of the resin A and the resin B has a minimum film-forming temperature at least 30° C. lower than that of the resin A.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

According to the present invention, an ink is provided which demonstrates high level of image gloss when images are formed with the ink on non-porous substrates and firmly adheres to various substrates including non-porous substrates while printed matter of the ink demonstrates excellent abrasion resistance.

The present disclosure will be described below in detail with reference to several embodiments and accompanying drawings.

Embodiment 1 of the present disclosure is an ink containing water, a hydrosoluble organic solvent, a colorant, a resin A; and a resin B, wherein the content of the resin B is from 0.5% by weight to less than 10% by weight to the content of the resin A and the resin B has a minimum film-forming temperature at least 30° C. lower than that of the resin A.

Embodiments of 1 mentioned above also includes the following 2 to 9. Therefore, these are also described.

2. The ink of 1 mentioned above, wherein the resin A has a minimum film-forming temperature of from 40° C. to lower than 200° C.

3. The ink of 1 or 2 mentioned above, wherein one of the resin A and the resin B is a urethane resin.

4. The ink of any one of 1 to 3 mentioned above, wherein the urethane resin is a polycarbonate-based urethane resin urethane resin.

5. The ink of 4 mentioned above, wherein the polycarbonate-based urethane resin has a structure derived from at least one kind of an alicyclic diisocyanate.

6. The ink of any one of 1 to 5 mentioned above, wherein the hydrosoluble organic solvent contains at least one of the compounds selected from the group consisting of 1,2-propane diol, 1,3-propane diol, 1,2-butane diol, 1,3-butane diol, and 2,3-butane diol.

7. An inkjet recording method including ejecting the ink of any one of 1 to 6 mentioned above by applying heat energy or mechanical energy to the ink to print an image on a recording medium.

8. The inkjet recording method of 7 mentioned above, further including heating the recording medium after the image is printed.

9. Recorded matter containing a recording medium; and an image formed on the recording medium using the ink of any one of 1 to 6 mentioned above.

In general, the higher the minimum film forming temperature (hereinafter referred to as MFT) of a resin is, the harder the applied film of the resin becomes. The attachability of the resin to a substrate and the traceability of the resin thereto tend to become better when the formed film has a low MFT and soft.

The present inventors have found that an ink containing multiple kinds of resins is suitable to strike the balance between the hardness (robustness) and the attachability of the ink if the resins are controlled to have an MFT difference of 30° C. or higher.

This mechanism is inferred as follows:

After the ink is deposited on a substrate, as water and a solvent are dried, a resin (hereinafter referred to as resin B) having a lower MFT starts film-forming and forms an attachment layer to a substrate.

Thereafter, as the solvent further evaporates, the resin (hereinafter referred to as resin A) having a higher MFT starts film-forming so that a protective layer is formed on the surface of the ink film (layer).

By intentionally forming the layer structure described above, the attachability and robustness are well-balanced.

Furthermore, it was found that when the content of the resin B to the content of the resin A ranges from 0.5% to less than 10%, since the resin B assists the resin A to form a film, the film is gradually formed around the resin B as the starting point, so that a higher level of image gloss is demonstrated than when the resin A is singly used.

When the content of the resin B is 10% by weight or greater, the balance of the compatibility between the resins falls, resulting in significant degradation of the image gloss of printed matter. For this reason, such an ink is not suitable to print an image on a non-porous substrate having a high grade of image gloss. When the content is less than 0.5% by weight, the attachability to a substrate tends to deteriorate and also the image gloss becomes lower in comparison with the range specified above.

Therefore, high grade of image gloss is obtained only when the condition mentioned in 1 is satisfied. Moreover, an ink having a high level of attachability to a substrate and excellent abrasion resistance are obtained.

In addition, since a polycarbonate-based urethane resin has excellent water resistance, heat resistance, abrasion resistance, and weathering properties due to strong agglomeration power of the carbonate group, if one of the resin A and the resin B is a polycarbonate-based urethane resin, the abrasion resistance of printed matter ameliorates. When the resin A is a polycarbonate-based urethane resin, abrasion resistance becomes particularly good so that the ink obtained becomes suitable for use in a severe environment like outdoor.

Furthermore, it is preferable to have a polycarbonate-based urethane resin having a structure derived from at least one kind of an alicyclic diisocyanate because the abrasion resistance of printed matter is further improved.

Moreover, it is preferable that the aqueous organic solvent contains at least one compound selected from the group consisting of 1,2-propane diol, 1,3-propane diol, 1,2-butane diol, 1,3-butane diol, and 2,3-butane diol because a higher grade of image gloss is easily demonstrated.

The other compositions of the ink of the present disclosure are described next.

Resin

In the present disclosure, the resin is preferably added to an ink in a state of resin emulsion in which resin particles are stably dispersed in water serving as a solvent.

In addition, the present disclosure contains two kinds of resins with the MFTs thereof 30° C. or wider apart. In the present disclosure, MFT means the lowest temperature below which no continuous transparent film is formed when a water dispersion element of a resin is thinly extended on a metal plate of aluminum, etc., and the temperature is raised. In the temperature range below MFT, the resin constituting the water dispersion element is white powder. To be specific, MFT is measured by an MFT measuring device available on market such as film-forming temperature tester (manufactured by Imoto machinery Co., LTD.) or TP-801 MFT tester (manufactured by TESTER SANGYO CO., LTD.). In the present disclosure, MFT is the measured value using a water dispersion element of a resin having a resin solid portion of 30% by weight.

In the present disclosure, if the difference of MFTs between the resin A having a higher MFT and the resin B having a lower MFT is 30° C. or greater, a target ink is obtained. Although it depends on the properties and the mass ratio of the resin B having a lower MFT as a partner of the resin A, the resin A preferably has an MFT of from 40° C. to lower than 200° C., or more preferably from 50° C. to lower than 100° C. to demonstrate its features in an actual machine.

The MFT of the resin B is preferably 30° C. or lower and more preferably 15° C. or lower.

Since both the resin A and the resin B easily form films by a hydrosoluble organic solvent added to manufacture inks in actual use and in addition the resin A is accelerated to form a film by the resin B, the heat of processing is not necessarily required when using the ink of the present disclosure.

In addition, it is preferable that the difference of MFTs between the resin A and the resin B is 50° C. or greater in terms of the balance between the attachability and the robustness.

In the present disclosure, there is no specific limit to the kind of the resin particles. Any resin particles can be selected to a particular application. Specific examples thereof include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

Any suitably synthesized resin particulates and products available on market are also usable.

Specific examples of the resin particulates available on market include, but are not limited to, Microgel E-1002 and E-5002 (styrene-acrylic-based resin particulates, manufactured by Nippon Paint co., Ltd.), Voncoat 4001 (acrylic-based resin particulates, manufactured by Dainippon Ink and Chemicals, Inc.), Voncoat 5454 (styrene/acrylic-based resin particulates, manufactured by Dainippon Ink and Chemicals, Inc.), SAE-1014 (styrene-acrylic-based resin particulates, manufactured by Nippon Zeon Co., Ltd.), and Saivinol SK-200 (acrylic-based resin particulates, manufactured by Saiden Chemical Industry Co., Ltd.), Primal AC-22 and AC-61 (acrylic-based resin particulates, manufactured by The Dow Chemical Company), NANOCRYL SBCX-2821 and 3689 (acrylic-silicone-based resin particulates, manufactured by Toyo Ink Co., Ltd.), and #3070 (methyl methacrylate polymer resin particulates, manufactured by MIKUNI COLOR LTD.).

Of these resins, acrylic-based resins and urethane resins are more preferable because of their particularly excellent fixability and ink stability. To improve the robustness of printed matter, one of the resin A and the resin B is preferably a urethane resin.

In addition, when dispersing resin particulates in an aqueous medium, it is possible to use a forcible emulsification type using a dispersant. However, since such a dispersant tends to remain in a layer (film), thereby weakening the robustness of the layer, a so-called self-emulsification type, which has anionic property in its molecule structure, is preferably used.

In terms of hydrodispersability, it is preferable that an anionic group is contained in an acid value range of from 5 mgKOH to 100 mgKOH/g. To impart excellent abrasion resistance and chemical resistance, it is particularly preferable that the acid value ranges from 5 mgKOH to 50 mgKOH/g.

In addition, specific examples of the anionic group include, but are not limited to, a carboxyl group, a carboxylate group, a sulfonic acid group, and a sulfonate group. Of these, it is preferable to use a partially or entirely neutralized carboxylate group or sulfonate group by a basic compound to maintain good water dispersion stability. To introduce such anionic group into a resin, it is good to use monomers having such anionic groups.

Specific examples of the basic compound usable to neutralize the anionic group include, but are not limited to, organic amines such as ammonium, triethyl amine, pyridine, and morpholine, alkanol amines such as monoethanol amine, and metal salt compounds containing Na. K. Li, Ca, etc. In the case of using a forcible emulsification method, a nonion surfactant or anion surfactant can be used. Of the two, a nonion surfactant is preferable in terms of water resistance.

Specific examples of the nonion surfactants include, but are not limited to, polyoxyethylene alkyl ether, polyoxyethylene alkylene alkyl ether, polyoxyethylene derivatives, polyoxyethylene aliphatic acid esters, polyoxyethylene polyol aliphatic acid ester, polyoxyethylene propylene polyol, sorbitan aliphatic acid ester, polyoxyethylene curable ricinus, polyoxyalkylene polycyclic phenyl ether, polyoxyethylene alkyl amine, alkyl alkanol amide, and polyalkylene glycol (meth) acrylate. Of these, polyoxyethylene alkyl ether, polyoxyethylene aliphatic acid esters, polyoxyethylene sorbitan aliphatic acid ester, and polyoxyethylene alkyl amine are preferable.

Specific examples of the anionic surfactants include, but are not limited to, alkyl sulfuric acid ester salts, polyoxyethylene alkyl ether sulfuric acid salts, alkyl benzene sulfonic acid salts, α-olefine sulfonic acid salts, methyl lauryl acid salts, sulfosuccinic acid salts, ether sulfonic acid salts, ether carboxylic acid salts, aliphatic acid salts, naphthalene sulfonic acid formalin condensed compounds, alkyl amine salts, quaternary ammonium salts, alkyl betaine, and alkyl amine oxide. Polyoxyethylene alkyl ether sulfuric acid salts and sulfosuccinic salts are preferable.

The addition amount of a surfactant is from 0.1% by weight to 30% by weight and preferably from 5% by weight to 20% by weight to the amount of a resin. Within the range of from 0.1% by weight to 30% by weight, since the film forming property of a resin emulsion is not inhibited, an ink having excellent attachability and water resistance is obtained, so that printed matter never or little causes blocking, which is preferable.

In addition, with regard to the particle diameter of the resin particulates, considering using these in an inkjet recording device, the volume average particle diameter is preferably from 10 nm to 1,000 nm, more preferably from 10 nm to 200 nm, and furthermore preferably from 10 nm to 100 nm.

By using resin particulates having a volume average particle diameter of from 10 nm to 100 nm, the contact portions between the hydrosoluble organic solvent and the surface of the resin particulates increase the film-forming property of the resin particulates is improved, thereby forming a continuous film of a robust resin, so that printed matter having a high level of toughness is obtained.

The volume average particle diameter can be measured by using a particle size analyzer (Microtrac MODEL UPA 9340, manufactured by Nikkiso Co., Ltd.).

In the present disclosure, the ink contains two or more kinds of resins. The content of all the resins preferably ranges from 1% by weight to 10% by weight in the total content of an ink in terms of fixability and ink stability and more preferably from 5% by weight to 10% by weight in terms of improvement of the smoothness of the ink layer, thereby ameliorating the image gloss and fixability on a substrate.

In addition, to secure a high level of image gloss for a non-porous substrate, the suitable content of the resin B having a lower MFT is 0.5% to less than 10% of the content of the resin A having a higher MFT. To secure a higher grade of image gloss and improve the robustness of a film, the range of from 0.7% to 9% is preferable and the range of from 3% to 6% is more preferable.

The MFT of a resin is controlled to obtain the ink of the present disclosure. For example, the glass transition temperature (hereinafter referred to as Tg) of the resin is controlled. When the resin is a copolymer, it is possible to control the MFT by changing the ratio of the monomers forming the copolymer.

The particle diameter of the resin can be a factor of control. The MFT of a resin can be controlled by such a factor to acquire a target value.

Urethane Resin
The urethane resin in the present disclosure has no particular limit and can be any urethane resin obtained by reaction between, for example, a polyol and a polyisocyanate.

The usable polyols are, for example, polyether polyols, polycarbonate polyols, and polyester polyols.
Polyether Polyol
As the polyether polyol, for example, a product can be used which is obtained by addition polymerization of alkylene oxide while using one or two or more kinds of compound having at least two active hydrogen atoms as the starting material.

Specific examples of the starting materials include, but are not limited to, ethylene glycol, diethylene glycol, triethylene glycol, propylene glycol, trimethylene glycol, 1,3-butane diol, 1,4-butane diol, 1,6-hexane diol, glycerin, trimethylol ethane, and trimethylol propane.

In addition, specific examples of the alkylene oxide include, but are not limited to, ethylene oxide, propylene oxide, butylene oxide, styrene oxide, epichlorohydrine, and tetrahydrofuran.

As the polyether polyol, in terms of obtaining a binder for ink for inkjet recording capable of imparting extremely high level of abrasion resistance, it is suitable to use polyoxytetramethylene glycol or polyoxypropylene glycol.

As polycarbonate polyol for use in manufacturing the urethane resin A, it is possible to use a product obtained by, for example, reaction between a carboxylic acid ester and a polyol or reaction between phosgene and bisphenol A.
Polycarbonate Polyol
Specific examples of the carboxylic acid esters include, but are not limited to, methyl carbonate, dimethyl carbonate, ethyl carbonate, diethyl carbonate, cyclocarbonate, and diphenyl carbonate.

Specific examples of the polyol reactive with the carboxylic acid ester include, but are not limited to, dihydroxy compounds having a relatively low molecular weight such as ethylene glycol, diethylene glycol, triethylene glycol, 1,2-propylene glycol, 1,3-propylene glycol, dipropylene glycol, 1,4-butane diol, 1,3-butane diol, 1,2-butane diol, 2,3-butane diol, 1,5-pentane diol, 1,5-hexane diol, 2,5-hexane diol, 1,5-pentane diol, 1,5-hexane diol, 2,5-hexane diol, 1,6-hexane diol, 1,7-heptane diol, 1,8-octane diol, 1,9-nonane diol, 1,10-decane diol, 1,11-undecane diol, 1,12-dodecane diol, 1,4-cyclohexane diol, 1,4-cyclohexane dimethanol, hydroquinone, resorcin, bisphenol A, bisphenol F, and 4,4'-biphenol, and polyether polyols such as polyethylene glycol, polypropylene glycol, polyoxytetramethylene glycol, and polyester polyols such as polyhexanmethylene adipate, polyhexamethylene succinate, and polycaprolactone.
Polyester Polyol
As the polyester polyols, for example, it is possible to use a product obtained by esterification reaction between a polyol having a low molecular weight and a polycarboxylic acid, a polyester obtained by a ring-opening polymerization reaction of a cyclic ester compound such as ε caprolactone, or a coploymerized polyester thereof.

Specific examples of the polyol having a low molecular weight include, but are not limited to, ethylene glycol and propylene glycol.

Specific examples of the polycarboxylic acid include, but are not limited to, succinic acid, adipic acid, sebacic acid, dodecane dicarboxylic acid, terephthalic acid, isophthalic acid, phthalic acid, and anhydrides or ester forming derivatives thereof.
Polyisocyanate
Specific examples of polyisocyanate for use in manufacturing the urethane resins include, but are not limited to, aromatic diisocyanates such as phenylene diisocyanate, tolylene diisocyanate, diphenylmethane diisocyanate, and naphthalene diisocyanate, and diisocyanates having an aliphatic or alicyclic structure such as hexamethylene diisocyanate, lysine diisocyanate, cyclohexane diisocyanate, isophorone diisocyanate, dicyclohexylmethane diisocyanate, xylylene diisocyanate, tetramethyl xylylene diisocyanate, and 2,2,4-trimethyl hexamethylene diisocyanate. These can be used alone or in combination.

The ink of the present disclosure is expected to be applied to posters, signboards, etc., for outdoor use, so that an applied layer is demanded to have an extremely high level of weather resistance for a long period of time. In terms of this, using aliphatic or alicyclic diisocyanates is preferable.

Furthermore, it is preferable to add at least one kind of alicyclic diisocyanate, thereby easily acquiring a desired layer robustness. In particular, isophorone diisocyanate and dicyclohexylmethane diisocyanate are preferable. The ratio of alicyclic diisocyanate is preferably 60% by weight or more in all the isocyanate compounds.

Manufacturing Method

The urethane resin particulates for use in the ink of the present disclosure can be manufactured by, for example, the following typical methods.

First, a urethane prepolymer having an isocyanate group at its end is prepared under the presence of no solvent or an organic solvent by reacting the polyol and the polyisocyanate with an equivalent ratio in which isocyanate groups are excessive.

Next, optionally the anionic groups in the urethane prepolymer having an isocyanate group at its end is neutralized by a neutralizer. Thereafter, subsequent to reaction with a chain elongating agent, the organic solvent in the system is removed to obtain polycarbonate-based urethane resin particles.

Specific examples of usable organic solvents include, but are not limited to, ketone such as acetone and methyl ethyl ketone; ethers such as tetrahydrofuran and dioxane, acetic acid esters such as ethyl acetate and butylacetate, nitriles such as acetonitrile, dimethyl formamide, N-methyl pyrolidone, and N-ethyl pyrolidone. These can be used alone or in combination.

Polyamines or other compounds having active hydrogen group are used as the chain elongating agent.

Specific examples of the polyamine include, but are not limited to, diamines such as ethylene diamine, 1,2-propane diamine, 1,6-hexamethylene diamine, piperazine, 2,5-dimethyl piperazine, isophorone diamine, 4,4'-dicyclohexyl methane diamine, and 1,4-cyclohexane diamine; polyamines such as diethylene triamine, dipropylene triamine, and triethylene tetramine, hydrazines such as hydrazine, N,N'-dimethyl hydrazine, and 1,6-hexamethylene bis hydrazine; dihydrazides such as succinic acid dihydrazide, adipic acid dihydrazide, glutaric acid dihydrazide, sebacic acid dihydrazide, and isophthalic acid dihydrazide.

Specific examples of the other active hydrogen group containing compounds include, but are not limited to, glycols such as ethylene glycol, diethylene glycol, triethylene glycol, propylene glycol, 1,3-propane diol, 1,3-butane diol, 1,4-butane diol, hexamethylene glycol, saccharose, methylene glycol, glycerin, and sorbitol; phenols such as bisphenol A, 4,4'-duhydroxydiphenyl, 4,4'-dihydroxydiphenyl ether, 4,4'-dihydroxydiphenyl sulfone, hydrogenated bisphenol A, and hydroquinone, and water. These can be used alone or in combination unless degrading the storage stability of an ink.

The preferable ranges of addition form in an ink, the average particle diameter of particles, the dispersion method, the acid, etc., of the urethane resin are the same as those for the resin mentioned above.

If the ink of the present disclosure is heated after printing, the amount of residual solvent is decreased, thereby improving attachability, which is preferable. In particular, when the resin A has an MFT of 80° C. or higher, it is preferable to conduct heating to avoid poor film-forming of a resin. If heated, robustness is furthermore improved.

The resin A for use in the present disclosure preferably has a surface hardness of 100 N/mm$^2$ or greater when a film is formed. In this range, the ink forms a more robust layer, which leads to further improvement of abrasion resistance.

The upper limit of the surface hardness is 250 N/mm$^2$ in terms of maintaining the flexibility of printed matter.

The surface hardness is measured by the following method in the present disclosure:

After applying an emulsion of the resin A to a glass slide to form a layer (film) having a thickness of 10 the resin emulsion is dried at 100° C. for 30 minutes to form a resin film. Using a micro surface hardness tester (FISCHERSCOPE HM2000, manufactured by Fischer Instruments K.K. Japan), the pressed-in depth when a Berkovich indenter is pressed in under a load of 9.8 mN is obtained, which is measured as Martens hardness described in ISO14577-2002.

The ink of the present disclosure optionally contains resins other than the resin A and the resin B. However, the resin A and the resin B preferably account for 70% by weight or more and more preferably 90% by weight or more to all the resins contained in the ink.

The other compositions of the ink of the present disclosure are described next.

The ink of the present disclosure contains water, a colorant, a hydrosoluble organic solvent, and other optional compositions such as surfactants, preservatives and mildew-proofing agents, pH regulators, transparent anti-aging agents for rubber and plastic such as hindered phenol and hindered phenol amine.

Colorant

The colorant has no particular limit and can be a pigment and a dye. Pigments are preferably used as the main colorant.

As the colorant, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used as inorganic pigments.

As organic pigments, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used.

Of these pigments, pigments having good affinity with solvents are preferable.

Also, hollow resin particles and inorganic hollow particles can be used.

In addition, the addition amount of the pigment serving as the colorant in an ink composition preferably ranges from about 0.1% by weight to about 10% by weight and more preferably from about 1% by weight to about 10% by weight in terms of amelioration of image density, fixability, and ejection stability.

More preferred specific examples of the pigments for black in the present disclosure include, but are not limited to, carbon black (C.I. Pigment Black 7) such as furnace black, lamp black, acetylene black, and channel black, metals such as copper and iron (C.I. Pigment Black 11), metal compounds such as titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, and 155; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine blue), 15:1, 15:2, 15:3 (Phthalocyanine Blue), 16, 17:1, 56, 60, and 63; C.I. Pigment Green 1, 4, 7, 8, 10, 17, 18, and 36.

In addition, self-dispersion pigments can be used in which a functional group such as sulfone group and carboxyl group is attached to the surface of a pigment (e.g., carbon) to be dispersible in water.

Also, it is possible to use a material in which a pigment is encapsulated in a microcapsule to be dispersible in water.

These can be paraphrased as resin particulates containing pigment particles.

In this case, pigments mixed in an ink are not necessarily encapsulated or adsorbed in resin particulates. Such pigments can be dispersed in the ink within a scope in which the present disclosure is not impaired.

There is no specific limit to the particle diameter of the pigment. In the present disclosure, it is preferable to use a pigment ink having a particle diameter of from 20 nm to 150 nm at most frequency in maximum number conversion. When the particle diameter is 150 nm or less, the dispersion stability of pigment as the ink composition tends to be ameliorated and in addition, ejection stability tends to become excellent, thereby improving the image quality such as image density.

In addition, when the particle diameter is less than 20 nm, the storage stability of the ink composition and ejection properties at a printer are good. However, dispersion operation and classification operation become complicated to obtain such smaller particles, which makes it difficult to economically manufacture inks.

When dispersing a pigment using a dispersant, any known dispersant can be selected for use.

For example, dispersant polymers and hydrosoluble surfactants are usable.

Hydrosoluble Organic Solvent

With regard to the hydrosoluble organic solvent, there is no specific limit to the selection thereof in the present disclosure. Specific examples of thereof include, but are not limited to, polyols such as ethylene glycol, diethylene glycol, 1,2-propane diol, 1,3-propane diol, 1,2-butane diol, 1,3-butane diol, 2,3-butane diol, 3-methyl-1,3-butane diol, triethylene glycol, polyethylene glycol, polypropylene glycol, 1,5-pentane diol, 1,6-hexane diol, glycerin, 1,2,6-hexane triol, 2-ethyl-1,3-hexane diol, ethyl-1,2,4-butane triol, 1,2,3-butane triol, and petriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrolidone, N-methyl-2-pyrolidone, N-hydroxyethyl-2-pyrolidone, 1,3-dimethylimidazolidinone, ε-caprolactam, and γ-butyrolactone; amides such as formamide, N-methylformamide, and N,N-dimethylformamide; amines such as monoethanolamine, diethanolamine, and triethanolamine; sulfur-containing compounds such as dimethyl sulfoxide, sulfolane, and thiodiethanol; propylene carbonate, and ethylene carbonate.

These can be used alone or in combination.

Of these, in terms of accelerating film-forming of a resin and preventing agglomeration of particles, 1,2-propane diol, 1,3-propane diol, 1,2-butane diol, 1,3-butane diol, and 2,3-propane diol are particularly preferable to obtain excellent image gloss.

The total amount of the hydrosoluble organic solvent in the entire ink is preferably from 20% by weight to 70% by weight and more preferably from 30% by weight to 60% by weight. When the total amount is 20% by weight or less, the ink tends to be dried, which may lead to failure to obtain sufficient ejection stability. When the total amount is greater than 70% by weight, viscosity tends to become high, thereby failing to eject the ink.

Surfactant

As for the ink of the present disclosure, a surfactant can be added so as to secure the wettability of the ink to a recording medium.

The addition amount of a surfactant to an ink is preferably from 0.1% by weight to 5% by weight. When the addition amount is 0.1% by weight or more, the wettability of an ink to a non-porous substrate is secured, thereby improving the image quality. When the addition amount is 5% by weight or less, the ink tends not to foam so that excellent ejection stability is achieved.

There is no particular limit to the selection of surfactants satisfying the condition of this addition amount. The surfactant can be any of amphoteric surfactants, nonionic surfactants, and anionic surfactants.

Considering the relation between the ejection stability of a colorant and the image quality, nonionic surfactants are preferable, which include polyoxyethylene alkyl phenyl ether, polyoxyethylene alkyl ester, polyoxyethylene alkyl amine, polyoxyethylene alkyl amide, polyoxyethylene propylene block polymer, sorbitan aliphatic acid esters, polyoxyethylene sorbitan aliphatic acid esters, and adducts of acetylene alcohol with ethylene oxides, etc. In addition, it is possible to add a fluorine-containing surfactant and/or silicone-based surfactant depending on formulation.

Other Additives

In addition to the ink compositions mentioned above, it is possible to use additives such as preservatives and fungicides, corrosion inhibitors, and pH regulators.

Specific examples of the preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors include, but are not limited to, acid sulfite, thiosodium sulfate, ammonium thiodiglycolate, diisopropyl ammonium nitrite, pentaerythritol tetranitrate, and dicyclohexyl ammonium nitrite.

The pH regulator can be any material that can adjust pH to a desired value without an adverse impact on an ink.

Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink of the present disclosure is manufactured by dispersing or dissolving the ink composition mentioned above in an aqueous medium followed by optional mixing and stirring steps.

Typically, a stirrer using a stirring blade, a magnetic stirrer, a high performance disperser etc., can be used for mixing and stirring.

The ink of the present disclosure is used in any printer having an inkjet head such as a piezoelectric element type in which ink droplets are ejected by transforming a vibration plate forming the wall of the ink flowing path using a piezoelectric element as a pressure generating device to press the ink in the ink flowing path; a thermal type in which bubbles are produced by heating ink in the ink flowing path with a heat element; and an electrostatic type in which ink droplets are ejected by transforming a vibration plate that forms the wall surface of the ink flowing path by a force of electrostatic generated between the vibration plate and the electrode while the vibration plate and the electrode are provided facing each other.

When the ink of the present disclosure is used for a non-porous substrate, images having a high level of gloss and image robustness can be produced. Of the non-porous substrates, plastic film such as vinyl chloride resin film, polyethylene terephthalate (PET) film, and polycarbonate film are particularly suitable. In addition, the ink of the present disclosure is suitable for other non-porous substrates and conventionally used porous media such as plain paper or inorganic coated porous media.

The ink of the present disclosure can be used to print high quality images on non-porous media. However, it is more preferable to heat a recording medium after printing in terms of forming an image with higher quality, abrasion resistance, and attachability and demonstrating high performance in high speed performance printing conditions.

As the heating device (heater), many known heating devices can be used. Specific examples thereof include, but are not limited to, devices for forced-air heating, radiation heating, conduction heating, or microwave drying. These can be used alone or in combination.

The heating temperature can be changed depending on the identity and amount of a hydrosoluble organic solvent contained in an ink and the minimum film forming temperature (MFT) of an added polycarbonate-based urethane resin emulsion. It also can be changed depending on the identity of the substrate for printing.

The heating temperature is preferably high in terms of drying property and film-forming temperature. However, if the heating temperature is too high, a substrate on which an image is printed is damaged or an ink head is even heated, thereby causing non-ejection of ink. This is not preferable.

The heating temperature is preferably from 40° C. to 120° C. and more preferably from 50° C. to 90° C.

Figure 1:
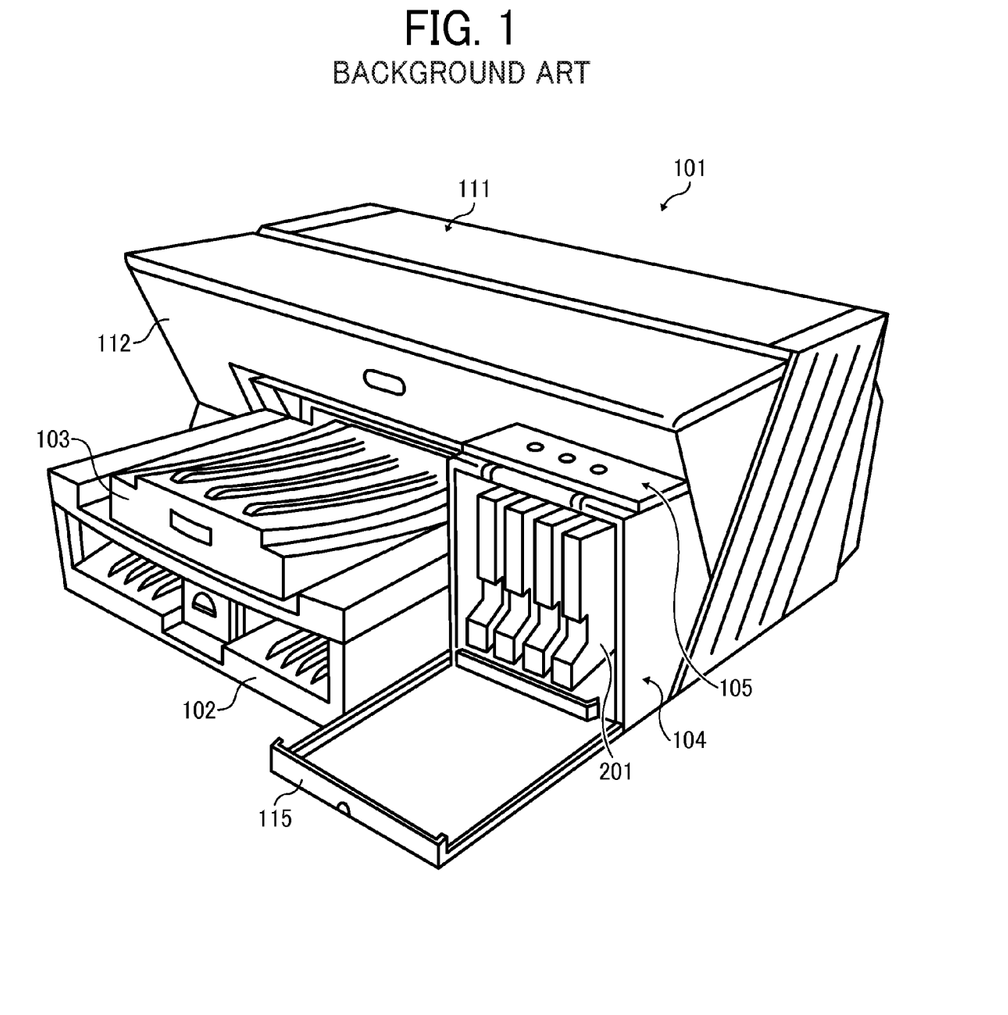
FIG. 1 is a schematic diagram illustrating an example of a serial type inkjet recording device.

An embodiment of the inkjet recording device capable of image recording with the ink of the present disclosure is described with reference to the drawings. In this embodiment, paper is used but images can also be recorded similarly on other porous substrates or non-porous substrates. In addition, the inkjet recording device includes a serial type (shuttle type) that scans by a carriage and a line type having a line type head. FIG. 1 is a schematic diagram illustrating an embodiment of the serial type inkjet recording device.

An inkjet recording device 101 has a sheet feeder tray 102, a sheet ejection tray 103, and an ink cartridge inserting unit 104, which are mounted to the inkjet recording device 101.

On the upper surface of the ink cartridge inserting unit 104 is arranged an operating portion 105 including operation keys, a display, etc. The ink cartridge inserting unit 104 has a front cover 115 that is openable and closable to detach and attach an ink cartridge 201. The reference numeral 111 represents an upper cover and, 112, the front surface of the front cover.

Figure 2:
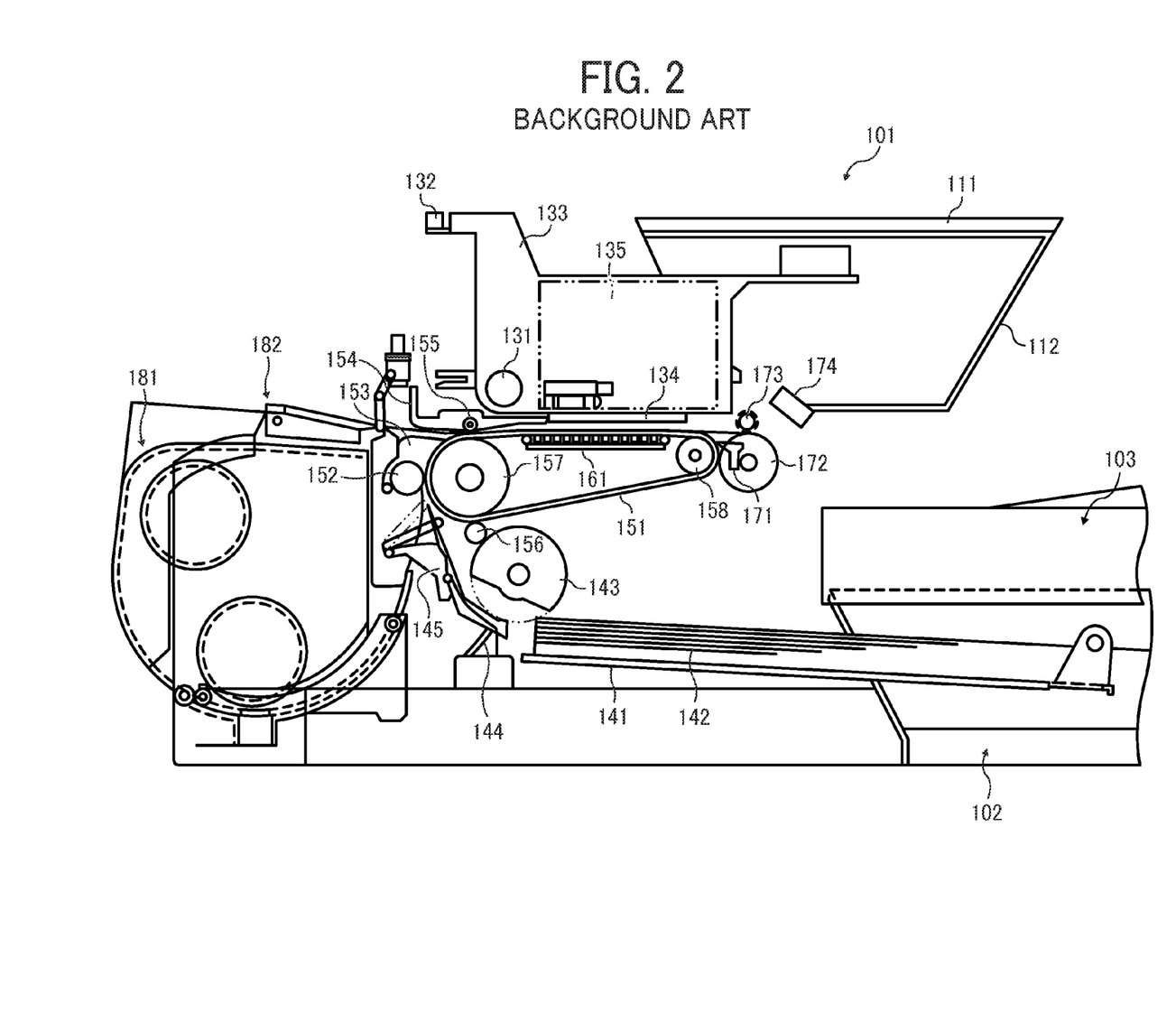
FIG. 2 is a schematic diagram illustrating the configuration of the recording device illustrated in FIG. 1.

Inside the inkjet recording device 101, as illustrated in FIG. 2, a guide rod 131 serving as a guiding member that laterally bridges side plates provided on the right side and left side and a stay 132 hold a carriage 133 slidably movable in the main scanning direction. A main scanning motor moves the carriage 133 for scanning.

The carriage 133 has a recording head 134 having four inkjet recording heads that eject ink droplets of each color of yellow (Y), cyan (C), magenta (M), and black (Bk) while multiple ink ejection mouths are arranged in the direction crossing the main scanning direction with the ink droplet discharging direction downward.

As the heads for inkjet recording that form the recording head 134, it is possible to use a device having an energy-generating device to eject (discharge) ink such as a piezoelectric actuator such as a piezoelectric element, a thermal actuator that utilizes the phase change caused by film boiling of liquid by using an electric heat conversion element such as a heat element, a shape-memory alloy actuator that uses the metal phase change due to the temperature change, and an electrostatic actuator that uses an electrostatic force.

The carriage 133 has sub tanks 135 for colors to supply each color ink to the recording head 134. The ink of the present disclosure is supplied and replenished to the sub tank 135 from the ink cartridge 201 mounted onto the ink cartridge inserting unit 104 via a tube for supplying ink.

A sheet feeding unit to feed a substrate 142 loaded on a substrate loader (pressure plate) 141 of the sheet feeder tray 102 includes a half-moon shape roller (sheet feeding roller 143) to separate and feed the substrate 142 one by one from the substrate loader 141 and a separation pad 144 that is made of a material having a large friction index and biased towards the sheet feeding roller 143.

A transfer unit to transfer the substrate 142 fed from the sheet feeding unit on the lower side of the recording head 134 includes a transfer belt 151 to electrostatically adsorb and transfer the substrate 142, a counter roller 152 to transfer the substrate 142 fed from the sheet feeding unit via a guide 145 while pinching the substrate 142 with the transfer belt 151, a transfer guide 153 to make the substrate 142 trace on the transfer belt 151 by changing the transfer direction of the sheet 142 being sent substantially vertically upward by substantially 90°, a front end pressure roller 155 biased towards the transfer belt 151 by a pressing member 154, and a charging roller 156 to charge the surface of the transfer belt 151.

The transfer belt 151 has an endless form, stretched between a transfer roller 157 and a tension roller 158 and is rotatable in the belt transfer direction. This transfer belt 151 has, for example, a top layer serving as a non-porous substrate adsorption surface made of a resin material such as a copolymer (ETFE) of tetrafluoroethylene and ethylene with no resistance treatment having a thickness about 40 μm, and a bottom layer (intermediate resistance layer, earth layer) made of the same material as that for the top layer with resistance treatment with carbon. On the rear side of the transfer belt 151, a heater system guiding member 161 is arranged corresponding to the printing area by the recording head 134. An ejection unit to eject the substrate 142 on which images are recorded by the recording head 134 includes a separation claw 171 to separate the substrate 142 from the transfer belt 151, a sheet-ejection roller 172, and a sheet ejection roller 173. The substrate 142 is dried by heat wind by a fun heater 174 and thereafter output to a sheet ejection tray 103 arranged below the sheet-ejection roller 172.

A duplex printing sheet feeding unit 181 is attached in a detachable and attachable manner to the rear side of the inkjet recording device 101.

The duplex printing sheet feeding unit 181 takes in and reverses the substrate 142 that is returned by the reverse rotation of the transfer belt 151 and feeds it again between the counter roller 152 and the transfer belt 151. A bypass sheet feeding unit 182 is provided on the upper surface of the duplex printing sheet feeding unit 181.

In this inkjet recording device, the substrate 142 is separated and fed from the sheet feeding unit one by one substantially vertically upward, guided by the guide 145, and transferred while being pinched between the transfer belt 151 and the counter roller 152. Furthermore, the front end of the substrate 142 is guided by the transfer guide 153 and pressed against the transfer belt 151 by the front end pressure roller 155 to change the transfer direction substantially 90°. Since the transfer roller 157 is charged by the charging roller 156 at this point in time, the substrate 142 is electrostatically adsorbed to the transfer belt 151 and transferred.

By driving the recording head 134 in response to the image signal while moving the carriage 133, the ink droplet is ejected to the substrate 142 not in motion to record an image in an amount of one line and thereafter the substrate 142 is transferred in a predetermined amount to be ready for the recording for the next line. On receiving a signal indicating that the recording has completed or the rear end of the substrate 142 has reached the image recording area, the recording operation stops and the substrate 142 is ejected to the sheet-ejection tray 103.

The ink of the present disclosure is not limited to inkjet recording method and can be applied in other fields. In addition to the inkjet recording methods, specific examples of other application methods of the ink of the present disclosure include, but are not limited to, a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro gravure coating method, a reverse roll coating method, a four or five roll coating method, a dip coating method, a curtain coating method, a slide coating method, and a die coating method.

The recorded matter is preferably obtained by applying n ink to a recording medium.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto. In Examples and Comparative Examples, % represents % by weight.

Preparation of Polycarbonate-Based Urethane Resin Emulsion 1

1,500 g of polycarbonate diol (reaction product of 1,6-hexane diol and dimethyl carbonate, the number average molecular weight Mn: 1,200), 220 g of 2,2-dimethylol propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60° C. to dissolve DMPA. Thereafter, 1,445 g of 4,4'-dicyclohexyl methane diisocyanate and 2.6 g of dibutyl tin laurylate (catalyst) were added thereto and the resultant was heated to 90° C. to complete urethanification reaction in five hours. Thus, a urethane prepolymer having an isocyanate group at its end was obtained. This reaction mixture was cooled down to 80° C. and 149 g of triethyl amine was admixed therewith. 4,340 g of the resultant mixture was extracted and charged in a liquid mixture of 5,400 g of water and 15 g of triethyl amine while being vigorously stirred. Thereafter, 1,500 g of ice and 626 g of 35% 2-methyl-1,5-pentane diamine aqueous solution were added to conduct chain elongation reaction followed by distillation away of the solvent in such a manner that the solid portion concentration was 30% to obtain polycarbonate-based urethane resin emulsion 1.

Using this emulsion 1, the minimum film-forming temperature measured by film-forming temperature tester (manufactured by Imoto machinery Co., LTD.) was 55° C.

Preparation of Polycarbonate-Based Urethane Resin Emulsion 2

Polycarbonate-based urethane resin emulsion 2 was obtained in the same manner as in the preparation of the emulsion 1 except that 4,4'-dicyclohexyl methane diisocyanate was changed to isophorone diisocyanate.

Using this emulsion 2, the minimum film-forming temperature measured in the same manner as in 1 by film-forming temperature tester (manufactured by Imoto machinery Co., LTD.) was 83° C.

Preparation of Polycarbonate-Based Urethane Resin Emulsion 3

Polycarbonate-based urethane resin emulsion 3 was obtained in the same manner as in the preparation of the emulsion 1 except that polycarbonate diol (reaction product of 1,6-hexane diol and dimethyl carbonate) was changed to a polycarbonate diol (reaction product of 3-methyl-1,5-pentan diol and diphenyl carbonate) and 1,6-hexamethylene diamine was used instead of 2-methyl-1,5-pentane diamine as the chain elongation agent.

Using this emulsion 3, the minimum film-forming temperature measured in the same manner as in 1 by film-forming temperature tester (manufactured by Imoto machinery Co., LTD.) was 20° C.

Preparation of Polycarbonate-Based Urethane Resin Emulsion 4

Polycarbonate-based urethane resin emulsion 4 was obtained in the same manner as in the preparation of the emulsion 1 except that 4,4'-dicyclohexyl methane diisocyanate was changed to hexamethylene diisocyanate.

Using this emulsion 4, the minimum film-forming temperature measured in the same manner as in 1 by film-forming temperature tester (manufactured by Imoto machinery Co., LTD.) was 61° C.

Preparation of Acrylic Resin Emulsion 5

900 g of deionized water and 1 g of sodium lauryl sulfate were charged in a reaction container equipped with a stirrer, a reflux condenser, dripping device, and a thermometer and heated to 70° C. during nitrogen replacement while being stirred.

While keeping the temperature inside at 70° C., 4 g of potassium persulfate was added as polymerization initiator and dissolved. An emulsified material preliminarily prepared by adding 365 g of styrene, 545 g of butyl acrylate, and 10 g of methacrylic acid to 450 g of deionized water, 3 g of sodium lauryl sulfate, and 20 g of acrylamide while being stirred was continuously dripped to the reaction solution in four hours.

After dripping, the resultant was aged for three hours.

Thereafter, the thus-obtained aqueous emulsion was cooled down to room temperature and adjusted to have a solid portion of 30% by weight and a pH of 8 by adding deionized water and sodium hydroxide.

Using this emulsion 5, the minimum film-forming temperature measured in the same manner as in 1 by film-forming temperature tester (manufactured by Imoto machinery Co., LTD.) was 2° C.

Preparation of Acrylic Resin Emulsion 6

900 g of deionized water and 1 g of sodium lauryl sulfate were charged in a reaction container equipped with a stirrer, a reflux condenser, dripping device, and a thermometer and heated to 70° C. during nitrogen replacement while being stirred.

While keeping the temperature inside at 70° C., 4 g of potassium persulfate was added as polymerization initiator and dissolved. An emulsified material preliminarily prepared by adding 615 g of styrene, 30 g of butyl acrylate, and 30 g of methacrylic acid to 450 g of deionized water, 3 g of sodium lauryl sulfate, and 20 g of acrylamide while being stirred was continuously dripped to the reaction solution in four hours.

After dripping, the resultant was aged for three hours.

Thereafter, the thus-obtained aqueous emulsion was cooled down to room temperature and adjusted to have a solid portion of 30% by weight and a pH of 8 by adding deionized water and sodium hydroxide.

Using this emulsion 6, the minimum film-forming temperature measured in the same manner as in 1 by film-forming temperature tester (manufactured by Imoto machinery Co., LTD.) was 53° C.

Preparation of Polyether-Based Urethane Resin Emulsion 7

100.2 parts of polyether polyol (PTMG1000, molecular weight: 1,000, manufactured by Mitsubishi Chemical Corporation), 15.7 parts of 2,2-dimethylol propionic acid, 48.0 part of isophorone diisocyanate, 77.1 parts of methylethyl ketone as organic solvent were caused to react in a nitrogen-replaced container equipped with a thermometer, a nitrogen introducing tube, and a stirrer using 0.06 parts of dibutyl tin dilaurate (DMTDL) as catalyst.

After continuing the reaction for four hours, 30.7 parts of methylethyl ketone was supplied as diluting agent to further continue the reaction.

When the molecular weight of the reaction product reached to the range of from 20,000 to 60,000, 1.4 parts of methanol was charged to complete the reaction so that an organic solvent solution of urethane resin was obtained.

By adding 13.4 parts of 48% by weight potassium hydroxide aqueous solution to the organic solvent solution of urethane resin to neutralize the carboxyl group contained in the urethane resin. Thereafter, 715.3 parts of water was added followed by sufficient stirring and aging and solvent removal to obtain a polyether-based urethane resin emulsion 7 having a solid portion of 30% by weight.

Using this emulsion 7, the minimum film-forming temperature measured in the same manner as in 1 by film-forming temperature tester (manufactured by Imoto machinery Co., LTD.) was 43° C.

Preparation of Polyester-Based Urethane Resin Emulsion 8

A polyester-based urethane resin emulsion 8 was obtained in the same manner as in the polyether-based urethane resin emulsion 7 except that polyester polyol (Polylite OD-X-2251, molecular weight: 2,000, manufactured by DIC Corporation) was used.

Using this emulsion 8, the minimum film-forming temperature measured in the same manner as in 1 by film-forming temperature tester (manufactured by Imoto machinery Co., LTD.) was 74° C.

Preparation of Liquid Dispersion of Black Pigment

After preliminarily mixing the following recipe, a liquid dispersion of black pigment was obtained by conducting circulation dispersion for seven hours by a disk-type bead mill (KDL type, manufactured by SHINMARU ENTERPRISES CORPORATION; Media: zirconia ball having a diameter of 0.3 mm).

| | |
|---|---|
| Carbon black pigment (Monarch 800, manufactured by Cabot Corporation): | 15 parts |
| Anionic surfactant (Pionine A-51-B, manufactured by TAKEMOTO OIL & FAT Co., Ltd.): | 2 parts |
| Deionized water | 83 parts |

Preparation of Liquid Dispersion of Cyan Pigment

A liquid dispersion of cyan pigment was obtained in the same manner as in the liquid dispersion of black pigment except that Pigment Blue 15:4 was used as the pigment.

Preparation of Liquid Dispersion of Magenta Pigment

A liquid dispersion of magenta pigment was obtained in the same manner as in the liquid dispersion of black pigment except that Pigment Red 122 was used as the pigment.

Preparation of Liquid Dispersion of Yellow Pigment

A liquid dispersion of yellow pigment was obtained in the same manner as in the liquid dispersion of black pigment except that Pigment Yellow 74 was used as the pigment.

Example 1

Preparation of Black Ink 1

The recipe shown in Table 1 was mixed and stirred and thereafter filtrated by a polypropylene filter of 0.2 μm to manufacture a black ink. The surfactant in Table was SOFTANOL EP7025 (manufactured by NIPPON SHOKUBAI CO., LTD.).

Example 2

Preparation of Cyan Ink 1

The recipe shown in Table 1 was mixed and stirred and thereafter filtrated by a polypropylene filter of 0.2 μm to manufacture a cyan ink.

Example 3

Preparation of Magenta Ink 1

The recipe shown in Table 1 was mixed and stirred and thereafter filtrated by a polypropylene filter of 0.2 μm to manufacture a magenta ink.

Example 4

Preparation of Yellow Ink 1

The recipe shown in Table 1 was mixed and stirred and thereafter filtrated by a polypropylene filter of 0.2 μm to manufacture a yellow ink.

Example 5

Preparation of Black Ink 2

The recipe shown in Table 1 was mixed and stirred and thereafter filtrated by a polypropylene filter of 0.2 μm to manufacture a black ink.

Example 6

Preparation of Black Ink 3

The recipe shown in Table 1 was mixed and stirred and thereafter filtrated by a polypropylene filter of 0.2 μm to manufacture a black ink.

Example 7

Preparation of Cyan Ink 2

The recipe shown in Table 1 was mixed and stirred and thereafter filtrated by a polypropylene filter of 0.2 μm to manufacture a cyan ink.

Example 8

Preparation of Black Ink 4

The recipe shown in Table 1 was mixed and stirred and thereafter filtrated by a polypropylene filter of 0.2 μm to manufacture a black ink.

Example 9

Preparation of Cyan Ink 3

The recipe shown in Table 1 was mixed and stirred and thereafter filtrated by a polypropylene filter of 0.2 μm to manufacture a cyan ink.

Example 10

Preparation of Black Ink 5

The recipe shown in Table 1 was mixed and stirred and thereafter filtrated by a polypropylene filter of 0.2 μm to manufacture a black ink.

Example 11

Preparation of Cyan Ink 4

The recipe shown in Table 1 was mixed and stirred and thereafter filtrated by a polypropylene filter of 0.2 μm to manufacture a cyan ink.

Comparative Example 1

Preparation of Black Ink 6

The recipe shown in Table 1 was mixed and stirred and thereafter filtrated by a polypropylene filter of 0.2 μm to manufacture a black ink.

Comparative Example 2

Preparation of Black Ink 7

The recipe shown in Table 1 was mixed and stirred and thereafter filtrated by a polypropylene filter of 0.2 μm to manufacture a black ink.

Comparative Example 3

Preparation of Black Ink 8

The recipe shown in Table 1 was mixed and stirred and thereafter filtrated by a polypropylene filter of 0.2 μm to manufacture a black ink.

Comparative Example 4

Preparation of Black Ink 9

The recipe shown in Table 1 was mixed and stirred and thereafter filtrated by a polypropylene filter of 0.2 μm to manufacture a black ink.

Comparative Example 5

Preparation of Black Ink 10

The recipe shown in Table 1 was mixed and stirred and thereafter filtrated by a polypropylene filter of 0.2 μm to manufacture a black ink.

Comparative Example 6

Preparation of Black Ink 11

The recipe shown in Table 1 was mixed and stirred and thereafter filtrated by a polypropylene filter of 0.2 μm to manufacture a black ink.

Comparative Example 7

Preparation of Black Ink 12

The recipe shown in Tables 1 to was mixed and stirred and thereafter filtrated by a polypropylene filter of 0.2 μm to manufacture a black ink.

TABLE 1

|  | Example 1 | Example 2 | Example 3 | Example 4 | Example 5 |
|---|---|---|---|---|---|
| Liquid dispersion of black pigment | 20 |  |  |  | 20 |
| Liquid dispersion of cyan pigment |  | 20 |  |  |  |

TABLE 1-continued

|  | Example 1 | Example 2 | Example 3 | Example 4 | Example 5 |
|---|---|---|---|---|---|
| Liquid dispersion of magenta pigment |  |  | 15 |  |  |
| Liquid dispersion of yellow pigment |  |  |  | 15 |  |
| Resin Emulsion 1 (MFT: 55° C.) | 15 |  |  |  | 15 |
| Resin Emulsion 2 (MFT: 83° C.) |  | 15 |  |  |  |
| Resin Emulsion 3 (MFT: 20° C.) |  |  |  | 0.1 | 1.35 |
| Resin Emulsion 4 (MFT: 61° C.) |  |  |  |  |  |
| Resin Emulsion 5 (MFT: 2° C.) | 0.45 | 0.9 |  |  | 0.45 |
| Resin Emulsion 6 (MFT: 53° C.) |  |  | 15 |  |  |
| Resin Emulsion 7 (MFT: 43° C.) |  |  |  |  |  |
| Resin Emulsion 8 (MFT: 74° C.) |  |  |  | 15 |  |
| Surfactant | 2 | 2 | 2 | 2 |  |
| 1,2-propane diol: | 20 |  |  |  |  |
| 1,3-propane diol |  | 20 |  |  |  |
| 1,2-butane diol |  |  | 20 |  |  |
| 1,3-butane diol |  |  |  | 20 |  |
| 2,3-butane diol |  |  |  |  | 20 |
| 2-methyl-1,3-butane-diol |  |  |  |  |  |
| 1,4-butane diol |  |  |  |  |  |
| Diethylene glycol-n-butyl ether: | 10 | 10 |  |  | 10 |
| Tripropylene glycol-n-methyl ether |  |  | 10 | 10 |  |
| PROXEL LV, manufactured by AVECIA GROUP | 0.1 | 0.1 | 0.1 | 0.1 | 0.1 |
| Highly pure water | Rest | Rest | Rest | Rest | Rest |
| Total | 100 | 100 | 100 | 100 | 100 |

|  | Example 6 | Example 7 | Example 8 | Example 9 | Example 10 | Example 11 |
|---|---|---|---|---|---|---|
| Liquid Dispersion of Black Pigment | 20 |  | 20 |  | 20 |  |
| Liquid dispersion of cyan pigment |  | 20 |  | 20 |  | 20 |
| Liquid dispersion of magenta pigment |  |  |  |  |  |  |
| Liquid dispersion of yellow pigment |  |  |  |  |  |  |
| Resin Emulsion 1 (MFT: 55° C.) |  |  |  |  | 15 |  |
| Resin Emulsion 2 (MFT: 83° C.) |  |  |  |  |  | 15 |
| Resin Emulsion 3 (MFT: 20° C.) |  |  |  | 0.9 |  |  |
| Resin Emulsion 4 (MFT: 61° C.) |  |  | 15 | 15 |  |  |
| Resin Emulsion 5 (MFT: 2° C.) | 0.45 | 0.1 | 0.45 |  | 0.45 | 0.9 |
| Resin Emulsion 6 (MFT: 53° C.) | 15 |  |  |  |  |  |
| Resin Emulsion 7 (MFT: 43° C.) |  | 15 |  |  |  |  |
| Resin Emulsion 8 (MFT: 74° C.) |  |  |  |  |  |  |
| Surfactant | 2 | 2 | 2 | 2 | 2 | 2 |
| 1,2-propane diol: | 20 |  | 20 |  |  |  |
| 1,3-propane diol |  | 20 |  | 20 |  |  |
| 1,2-butane diol |  |  |  |  |  |  |
| 1,3-butane diol |  |  |  |  |  |  |
| 2,3-butane diol |  |  |  |  |  |  |
| 2-methyl-1,3-butane-diol |  |  |  |  | 20 |  |
| 1,4-butane diol |  |  |  |  |  | 20 |
| Diethylene glycol-n-butyl ether: | 10 | 10 | 10 | 10 | 10 | 10 |
| Tripropylene glycol-n-methyl ether |  |  |  |  |  |  |
| PROXEL LV, manufactured by AVECIA GROUP | 0.1 | 0.1 | 0.1 | 0.1 | 0.1 | 0.1 |
| Highly pure water | Rest | Rest | Rest | Rest | Rest | Rest |
| Total | 100 | 100 | 100 | 100 | 100 | 100 |

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Liquid dispersion of black pigment | 20 | 20 | 20 | 20 | 20 | 20 | 20 |
| Liquid dispersion of cyan pigment |  |  |  |  |  |  |  |
| Liquid dispersion of magenta pigment |  |  |  |  |  |  |  |
| Liquid dispersion of yellow pigment |  |  |  |  |  |  |  |
| Resin Emulsion 1 (MFT: 55° C.) | 15 | 15 |  | 15 |  | 0.45 | 15 |
| Resin Emulsion 2 (MFT: 83° C.) |  |  |  |  |  | 15 |  |

TABLE 1-continued

| | | | | | | | |
|---|---|---|---|---|---|---|---|
| Resin Emulsion 3 (MFT: 20° C.) | | | | | | | |
| Resin Emulsion 4 (MFT: 61° C.) | | | | | | | |
| Resin Emulsion 5 (MFT: 2° C.) | 0.05 | 1.875 | 15 | | | | |
| Resin Emulsion 6 (MFT: 53° C.) | | | | | | | 0.45 |
| Resin Emulsion 7 (MET: 43° C.) | | | | | | | |
| Resin Emulsion 8 (MFT: 74° C.) | | | | | | | |
| Surfactant | 2 | 2 | 2 | 2 | 2 | 2 | 2 |
| 1,2-propane diol: | 20 | 20 | 20 | 20 | 20 | 20 | 20 |
| 1,3-propane diol | | | | | | | |
| 1,2-butane diol | | | | | | | |
| 1,3-butane diol | | | | | | | |
| 2,3-butane diol | | | | | | | |
| 2-methyl-1,3-butane-diol | | | | | | | |
| 1,4-butane diol | | | | | | | |
| Diethylene glycol-n-butyl ether: | 10 | 10 | 10 | 10 | 10 | 10 | 10 |
| Tripropylene glycol-n-methyl ether | | | | | | | |
| PROXEL LV, manufactured by AVECIA GROUP | 0.1 | 0.1 | 0.1 | 0.1 | 0.1 | 0.1 | 0.1 |
| Highly pure water | Rest | Rest | Rest | Rest | Rest | Rest | Rest |
| Total | 100 | 100 | 100 | 100 | 100 | 100 | 100 |

The thus-manufactured inks were evaluated in the following manner and the evaluation results are shown in Table 2.

Considering outdoor use, considerably strict criteria were employed for substrate attachability and abrasion resistance in comparison with printing on plain paper.

Judging from the evaluation results described below, the ink of the present disclosure is found to be suitable for outdoor use.

Substrate Attachability

An inkjet printer (IPSiO GXe5500, manufactured by Ricoh Company Ltd.) was filled with each manufactured ink and a solid image was printed on two kinds of substrates of a polyvinyl chloride (PVC) film and polyethylene terephthalate (PET) followed by drying at 80° C. for one hour.

According to the grid peeling test for the solid portion of the image using a cloth adhesive tape (123LW-50, manufactured by NICHIBAN CO., Ltd.), the number of grids remaining in the 100 test grids was counted for evaluation.

Evaluation of Image Gloss

An inkjet printer (IPSiO GXe5500, manufactured by Ricoh Company Ltd.) was filled with each manufactured ink and a solid image was printed on PVC film followed by drying at 80° C. for one hour.

Thereafter, gloss at 60° degree of the solid image portion was measured four times by a gloss meter (4501, manufactured by BYK Gardener) and evaluated based on the average thereof.

Evaluation on Abrasion Resistance

An inkjet printer (IPSiO GXe5500, manufactured by Ricoh Company Ltd.) was filled with each manufactured ink and a solid image was printed on PVC film followed by drying at 80° C. for one hour.

Thereafter, the solid portion was abraded by dried cotton (unbleached muslin No. 3) with a load of 400 g and evaluated about abrasion (friction) resistance according to the following criteria: The level C or higher have no problem for practical use.

A: No change in image when abraded 50+ times
B: Slight scratch observed when abraded 50 times but causing no impact on image density
C: Image density degraded when abraded 41 times to 49 time
D: Image density degraded when abraded 11 times to 40 time
E: Image density degraded when abraded less than 11 times To evaluate the ink of Example 12, the drying condition of 80° C. for one hour in Example 1 was changed to 25° C. for one light.

TABLE 2

| | PVC attachability evaluation | PET attachability evaluation | Evaluation of image gloss | Evaluation on of abrasion resistance |
|---|---|---|---|---|
| Example 1 | 100 | 100 | 101 | A |
| Example 2 | 100 | 100 | 98 | A |
| Example 3 | 100 | 100 | 99 | A |
| Example 4 | 100 | 100 | 110 | A |
| Example 5 | 100 | 100 | 100 | A |
| Example 6 | 100 | 100 | 107 | C |
| Example 7 | 100 | 100 | 97 | B |
| Example 8 | 100 | 100 | 108 | B |
| Example 9 | 100 | 100 | 111 | B |
| Example 10 | 100 | 100 | 87 | B |
| Example 11 | 100 | 100 | 84 | B |
| Example 12 | 98 | 100 | 101 | C |
| Comparative Example 1 | 43 | 16 | 105 | A |
| Comparative Example 2 | 100 | 100 | 48 | C |
| Comparative Example 3 | 100 | 96 | 62 | D |
| Comparative Example 4 | 97 | 12 | 80 | B |
| Comparative Example 5 | 0 | 0 | 3 | E |
| Comparative Example 6 | 95 | 88 | 78 | B |

TABLE 2-continued

| | PVC attachability evaluation | PET attachability evaluation | Evaluation of image gloss | Evaluation on of abrasion resistance |
|---|---|---|---|---|
| Comparative Example 7 | 58 | 52 | 83 | D |

Examples 1 to 5 are particularly preferable and the inks thereof show extremely high levels of attachability to substrate, image gloss, and abrasion resistance regardless of the difference of colors.

In Examples 6 and 7, both the resin A and the resin B are no polycarbonate-based urethane resins. Although the abrasion resistance shown in Examples 6 and 7 are inferior to that of Examples 1 and 2, the performances are still good.

Although polycarbonate-based urethane resins are contained in Examples 8 and 9, the polycarbonate-based resin skeletons include no structure derived from an alicyclic diisocyanate structure. Although Examples 8 and 9 are inferior to Examples 1 and 2 but has better abrasion resistance in comparison with Examples 6 and 7. As a whole, the performance of the inks of Examples 8 and 9 are good.

The inks of Examples 10 and 11 contains none of 1,2-propane diol, 1,3-propane diol, 1,2-butane diol, 1,3-butane diol, and 2,3-butane diol and are inferior about film-forming property so that image gloss and abrasion resistance are slightly inferior.

Since Example 12 include no heating process after printing, the performance of the ink is inferior but still the level above a practical problem.

In Comparative Example 1, the content of the resin B to that of the resin A is less than 0.5%, meaning that the addition amount is too small, so that the ink never or little attaches to the substrate.

In Comparative Example 2, the content of the resin B to that of the resin A is greater than 10%, meaning that the addition amount is too large, so that the resin A cannot form a uniform film, resulting in degradation of image gloss and abrasion resistance.

In Comparative Examples 3 and 4, only one kind of resin is contained.

Accordingly, the balance between attachability and robustness is bad, meaning that while attachability is excellent, robustness is inferior or the other way round.

In Comparative Example 5, no resin is contained. The result inks are far from being practical about all the evaluation items.

Although the two kinds of the resins are contained in Comparative Examples 6 and 7, the difference between MFTs thereof is less than 30° C. so that no sufficient film structure is formed. The results are not bad nor good for every evaluation item.

According to the present invention, an ink is obtained which demonstrates high level of image gloss when images are formed with the ink on non-porous substrates and firmly adheres to various substrates while printed matter of the ink demonstrates excellent abrasion resistance.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:
    water;
    a hydrosoluble organic solvent;
    a colorant;
    a resin A; and
    a resin B,
    wherein a content of the resin B is from 0.5% by weight to less than 10% by weight to a content of the resin A and the resin B has a minimum film-forming temperature at least 30° C. lower than that of the resin A.

2. The ink according to claim 1, wherein the resin A has a minimum film-forming temperature of from 40° C. to lower than 200° C.

3. The ink according to claim 1, wherein one of the resin A and the resin B is a urethane resin.

4. The ink according to claim 3, wherein the urethane resin is a polycarbonate-based urethane resin.

5. The ink according to claim 4, wherein the polycarbonate-based urethane resin has a structure derived from at least one kind of an alicyclic diisocyanate.

6. The ink according to claim 1, wherein the hydrosoluble organic solvent comprises at least one compound selected from the group consisting of 1,2-propane diol, 1,3-propane diol, 1,2-butane diol, 1,3-butane diol, and 2,3-butane diol.

7. An inkjet recording method comprising:
    ejecting the ink of claim 1 by applying heat energy or mechanical energy to the ink to print an image on a recording medium.

8. The inkjet recording method according to claim 7, further comprising heating the recording medium after the image is printed.

9. Recorded matter comprising:
    a recording medium; and
    an image formed on the recording medium using the ink of claim 1.

* * * * *